United States Patent Office 2,698,500
Patented Jan. 4, 1955

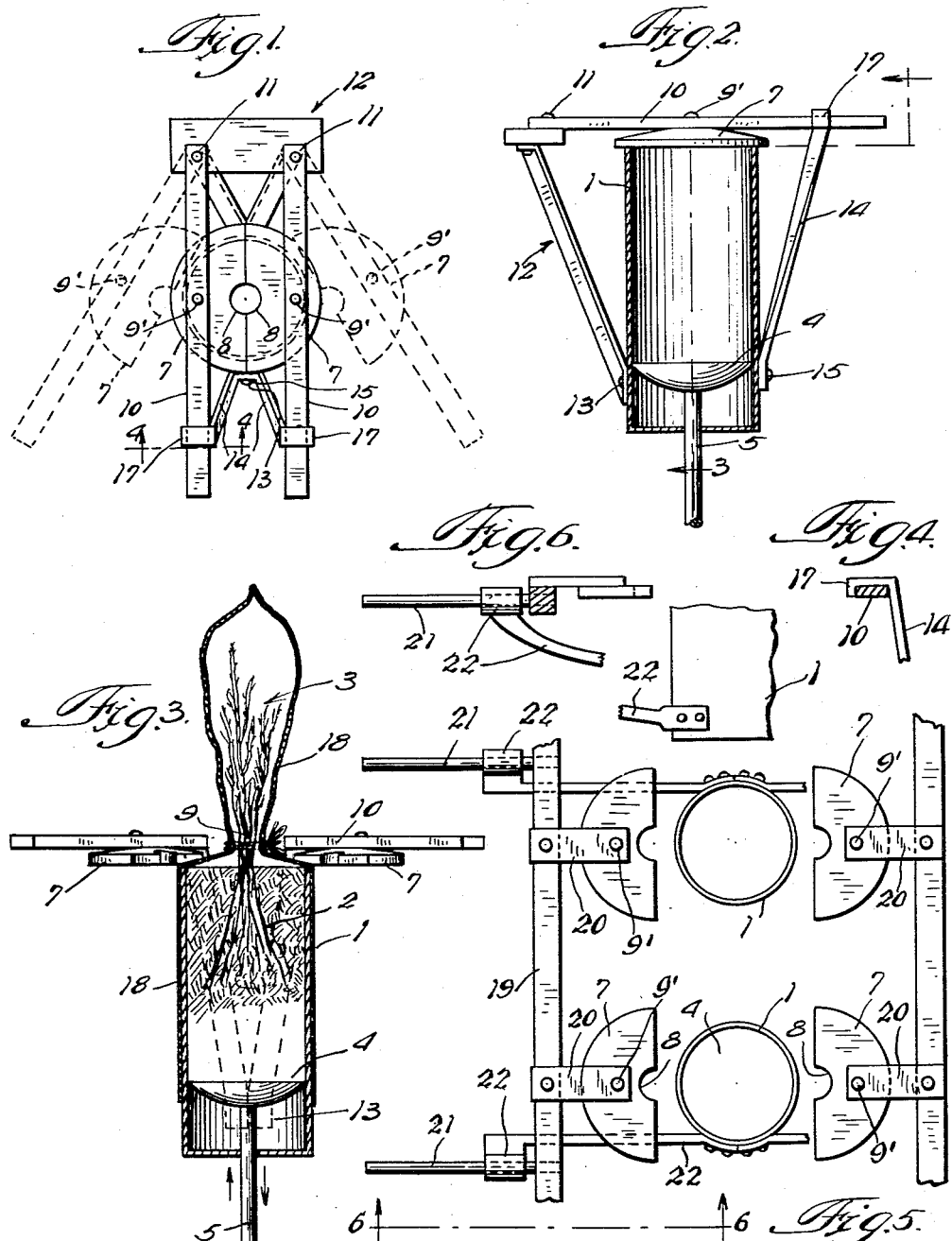

2,698,500

APPARATUS FOR PACKING THE ROOTS OF EXTRACTED PLANTS

Samuel E. Clegg, Plainfield, Ill.

Application November 28, 1951, Serial No. 258,594

7 Claims. (Cl. 47—1)

My invention relates to improved apparatus for compressing the roots of an extracted tree or plant, together with the earth between and surrounding the roots, into a compact mass. Specifically, it relates to such apparatus of the cylinder and piston type comprising a closure for one end of the cylinder made in separable sections readily movable away from the trunk of the plant.

One of the objects of my invention is to provide improved means for mounting these separable closure sections.

A further object of my invention is to provide an improved apparatus for enabling a bag to be placed about the plant.

Further objects will be apparent from the specification and claims.

In the drawings, in which two embodiments of my invention are shown:

Figure 1 is a plan view showing my improved apparatus;

Fig. 2 is an elevational view from the left of Fig. 1, parts being in section;

Fig. 3 is a sectional view substantially on the line 3—3 of Fig. 2, parts being shown in elevation;

Fig. 4 is a detail view on the line 4—4 of Fig. 1;

Fig. 5 is a plan view showing a different form of apparatus; and

Fig. 6 is a detail elevational view as seen from the line 6—6 of Fig. 5.

Referring to the drawings in detail, and first to Figs. 1 to 4, inclusive, the construction shown therein comprises a cylinder 1 into which the roots 2 of the tree or plant 3 are inserted after removal from the ground, and a piston 4 operating in the cylinder 1 for packing the dirt and roots. The piston rod 5 is operated by any power means, not shown, which operates through an opening in the lower end 6 of the cylinder. The upper end of the cylinder is closed by two semi-circular separable cylinder head members 7 which have registering recesses 8 for receiving the trunk 9 of the tree or plant, when swung to closed position as shown in full lines in Fig. 1. To facilitate the opening and closing of the cylinder head closure members 7, they are attached at 9', respectively, to two movable beams or levers 10 pivotally mounted at 11 on a mounting bracket 12 secured to the lower sides of the cylinder 1 at 13.

For securing the closure members 7 in closed position, a latch bracket 14 is provided, secured at 15 to the lower side portion of the cylinder 1, and having two upwardly and outwardly extending arms terminating in hook-like portions 17 underneath which the tilted beams or levers 10 may be hooked when the closure members 7 are in closing position.

In use, both of the levers 10 are swung to the dotted-line position shown in Fig. 1 to swing the cylinder head members 7 away from the tree trunk 9. The piston 4 is lowered and a shovelful or two of dirt is thrown in through the upper open end of the cylinder 1 onto the piston. The roots of the tree or plant with the dirt clinging thereto are inserted into the cylinder; some dirt is shoveled into the upper open end of the cylinder, this dirt finding its way downward onto and in between the roots, and more dirt is thrown in until the cylinder is about full. The semicircular cylinder head members 7 are then swung into place so as to embrace the trunk, and power is then applied to the piston rod 5. This pushes the whole mass inside of the cylinder upwardly, this mass including the dirt, roots, and the tree trunk. This compacts the entire mass including the dirt in between the roots and the dirt in the cylinder above the roots.

This packing does not result in bunching the roots laterally as would be the case if pressure were applied from the sides. It tends to concentrate or bunch the roots longitudinally and spreading them laterally. To remove the packed roots the cylinder head members are swung outwardly and further pressure may be applied to lift the piston 4 higher and push the roots and dirt packed around them out of the cylinder.

If desired, a sleeve-like covering 18 which may, if desired, be of transparent material, may be placed in position to surround the cylinder 1, either before or after the insertion of the plant into the cylinder. For this purpose, the lever-supporting brackets 12 and the lever latch brackets 14 are secured at their lower ends to the cylinder so that these brackets and latch members will be spaced from the outer surface of the cylinder 12 to enable the flexible cylindrical sheath or sleeve 18 to be pulled down over the cylinder as shown in Fig. 3 in such a manner that the plant may have its root end inserted into the cylinder through the open upper end with the bag in place surrounding the cylinder. The sleeve or bag may be drawn up snugly around the lower end of the trunk and above the upper end of the plant and tied up so as to snugly embrace the upper part of the plant as shown in Fig. 3. Sufficient clearance is provided so that the closure members can be moved into engagement with the trunk, leaving clearance between the upper edge of the cylinder and the closure members to avoid injury to the material of the bag.

In swinging the levers into position to bring the closure members together as the levers approach the upper hooked ends of the lever latches, the levers may be depressed low enough so as to slide under the hooked ends of the latches when they may be released to spring upwardly into hooked engagement.

In the construction shown in Figs. 5 and 6, a multiple cylinder apparatus is shown in which the closure members 7 are fastened to slidably mounted beams 19 which can be reciprocated to move the opposed closure members 7 toward and away from each other from open to closed position and vice versa. In this form, the closure members and their sliding supports on the right-hand side of the cylinders 1, as viewed in Fig. 5, may be substantially identical with the closure members and the slidably mounted beam 19 on the left-hand side.

Referring to the construction shown on the left-hand side, this comprises the slidably mounted beam 19 to which a plurality of closure members 7 are secured by brackets 20. The beams on which these brackets are mounted may be moved back and forth between a closing position in which the closure members 7 at the left-hand side of the cylinders 4 are in engagement with the opposing closure members on the right-hand side, to a position in which the upper open end of the cylinder is free for insertion and removal of the plants, etc.

For slidably mounting the beam 19, it is provided with a pair of slide rods 21, each slidably mounted in a guide bracket 22 secured to the side of the cylinder 1 as shown in Fig. 6. The use of this apparatus will be substantially the same as that described in connection with Figs. 1 to 4, inclusive, including the placing of the roots and dirt in the cylinder, the slipping of the sheath 18 in place over the cylinder 1, if desired, the closing movement of the cylinder head sections, the compressing movement of the piston, the opening of the closure members, and the removal of the mass of roots and dirt upwardly by further upward movement of the piston.

Both in the construction shown in Figs. 1 to 4, inclusive, and that shown in Figs. 5 and 6, the closure member 7 may be attached rigidly to the beams at 9', or if desired they may be attached pivotally to the beams to enable self-adjustment or manual adjustment of the closure members on the beam.

This application discloses subject matter common to this application and applicant's application Serial No. 142,135, filed February 3, 1950, now Patent 2,669,065, dated February 16, 1954, which contains claims generic to the two applications.

While the sheath-like cover 18 is shown and described as a flexible cylindrical sheath or sleeve long enough to enclose both the upper part of the plant and the roots and earth, and as drawn up and tied both above and below the upper part of the plant, this sheath-like cover might, under certain conditions, be made of substantially nonflexible material, for example, cardboard, might be only long enough to cover the roots and earth, might be noncylindrical, might be sealed at the top, and might be secured to be carried upwardly in ejecting the plant from the cylinder by bending inturned portions of a carton of relatively stiff material so that these inturned portions would engage the plant or earth.

While, as described above, the plant may be inserted into the cylinder with the sheath in place surrounding the cylinder, under certain conditions the sheath might be slipped over the plant after the plant is placed in the cylinder and after the piston has compressed the roots and earth.

Further modifications will be apparent to those skilled in the art and it is desired, therefore, that the invention be limited only by the scope of the appended claims.

Having thus described my invention, what I claim and desire to secure by Letters Patent is:

1. Apparatus for compressing the roots of an extracted plant, together with the earth between and surrounding the roots, into a compact mass comprising a cylinder into which the roots and earth are introduced, a closure for one end of the cylinder, surrounding the trunk of the plant, a piston in said cylinder having relative movement with respect thereto for compressing the roots and earth within the cylinder between said piston and closure, said closure being made in two separable sections readily movable away from the trunk to enable the removal of the tree and the compact mass from the cylinder and insertion of the roots of the plant and the adhering earth into the cylinder, and means for mounting said closure sections for movement toward and away from the trunk comprising two beams to which the closure sections are attached respectively, extending on opposite sides of the axis of the cylinder and mounted for movement toward and from said axis.

2. Apparatus for compressing the roots of extracted plants, together with the earth between and surrounding the roots, into compact masses comprising a plurality of cylinders into which the roots and earth are introduced, a closure for one end of each cylinder, surrounding the trunk of the the plant, a piston in said cylinder having relative movement with respect thereto for compressing the roots and earth within the cylinder between said piston and closure, said closure being made in two separable sections readily movable away from the trunk to enable the removal of the tree and the compact mass from the cylinder and insertion of the roots of the plant and the adhering earth into the cylinder, and means for mounting said closure sections for movement toward and away from the trunk comprising two beams, to which the closure sections are attached respectively, extending on opposite sides of the axes of the cylinders and mounted for movement toward and from said axes.

3. Apparatus for compressing the roots of an extracted plant, together with the earth between and surrounding the roots, into a compact mass comprising a cylinder into which the roots and earth are introduced, a closure for one end of the cylinder surrounding the trunk of the plant, a piston in said cylinder having relative movement with respect thereto for compressing the roots and earth within the cylinder between said piston and closure, said closure being made in two separable sections readily movable away from the trunk to enable the removal of the tree and the compact mass from the cylinder and insertion of the roots of the plant and the adhering earth into the cylinder, and means for mounting said closure sections for swinging movement toward and away from the trunk comprising two swingable beams to which the closure sections are attached respectively, extending on opposite sides of the axis of the cylinder and mounted for movement toward and from said axis.

4. Apparatus for compressing the roots of an extracted plant, together with the earth between and surrounding the roots, into a compact mass comprising a cylinder into which the roots and earth are introduced, a closure for one end of the cylinder surrounding the trunk of the plant, a piston in said cylinder having relative movement with respect thereto for compressing the roots and earth within the cylinder between said piston and closure, said closure being made in two separable sections readily movable away from the trunk to enable the removal of the tree and the compact mass from the cylinder and insertion of the roots of the plant and the adhering earth into the cylinder, and means for mounting said closure sections for sliding movement toward and away from the trunk comprising two beams to which the closure sections are attached respectively, extending on opposite sides of the axis of the cylinder and mounted for movement toward and from said axis.

5. Apparatus for compressing the roots of an extracted plant, together with the earth between and surrounding the roots, into a compact mass comprising a cylinder into which the roots and earth are introduced, a closure for one end of the cylinder surrounding the trunk of the plant, a piston in said cylinder having relative movement with respect thereto for compressing the roots and earth within the cylinder between said piston and closure, said closure being made in two separable sections readily movable away from the trunk to enable the removal of the tree and the compact mass from the cylinder and insertion of the roots of the plant and the adhering earth into the cylinder, and means for mounting said closure sections for movement toward and away from the trunk comprising two beams to which the closure sections are attached respectively, extending on opposite sides of the axis of the cylinder and mounted for movement toward and from said axis, said mounting means being spaced from said cylinder sufficiently to enable a flexible surrounding and protecting sheath to be drawn down over the outside of the cylinder between the mounting and the cylinder.

6. Apparatus for compressing the roots of an extracted plant, together with the earth between and surrounding the roots, into a compact mass comprising a cylinder into which the roots and earth are introduced, a closure for one end of the cylinder surrounding the trunk of the plant, a piston in said cylinder having relative movement with respect thereto for compressing the roots and earth within the cylinder between said piston and closure, said closure being made in two separable sections readily movable away from the trunk to enable the removal of the tree and the compact mass from the cylinder and insertion of the roots of the plant and the adhering earth into the cylinder, means for mounting said closure sections for swinging movement toward and away from the trunk comprising two swingable beams to which the closure sections are attached respectively, extending on opposite sides of the axis of the cylinder and mounted for movement toward and from said axis, and latch means for latching said beams to hold the closure sections in closed position.

7. Apparatus for compressing the roots of an extracted plant, together with the earth between and surrounding the roots, into a compact mass comprising a cylinder into which the roots and earth are introduced, a closure for one end of the cylinder, surrounding the trunk of the plant, a piston in said cylinder having relative movement with respect thereto for compressing the roots and earth within the cylinder between said piston and closure, said closure comprising a closure member readily movable toward and away from the trunk to enable the removal of the tree and the compact mass from the cylinder and the insertion of the roots of the plant and the adhering earth into the cylinder, and means for mounting said closure for movement toward and away from the trunk comprising a beam to which the closure is attached mounted for movement toward and from said axis.

References Cited in the file of this patent

UNITED STATES PATENTS

| | | |
|---|---|---|
| Re. 14,318 | Hayashi | June 19, 1917 |
| 262,496 | Stopple | Aug. 8, 1882 |
| 357,698 | Burrough | Feb. 15, 1887 |
| 1,664,913 | Bewley | Apr. 3, 1928 |
| 1,964,689 | Quillen | June 26, 1934 |
| 2,112,872 | Wilson | Apr. 5, 1938 |
| 2,393,102 | Gribner | Jan. 15, 1946 |
| 2,500,819 | Hall | Mar. 14, 1950 |
| 2,572,473 | Grove | Oct. 23, 1951 |
| 2,587,930 | Uschmann | Mar. 4, 1952 |
| 2,616,220 | Welch | Nov. 4, 1952 |
| 2,628,753 | Field | Feb. 17, 1953 |

FOREIGN PATENTS

| | | |
|---|---|---|
| 7,458 | Great Britain | of 1888 |